United States Patent
Dowdal

(10) Patent No.: US 7,346,005 B1
(45) Date of Patent: Mar. 18, 2008

(54) ADAPTIVE PLAYOUT OF DIGITAL PACKET AUDIO WITH PACKET FORMAT INDEPENDENT JITTER REMOVAL

(75) Inventor: John Dowdal, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 279 days.

(21) Appl. No.: 09/605,422

(22) Filed: Jun. 27, 2000

(51) Int. Cl.
*H04L 12/26* (2006.01)

(52) U.S. Cl. ..................... 370/252; 370/253

(58) Field of Classification Search ........... 379/516, 379/519, 517, 508, 503, 506, 229–232, 389, 379/235, 253, 394, 392, 252, 235.2, 428, 379/238, 371
See application file for complete search history.

(56) References Cited

U.S. PATENT DOCUMENTS

| | | | | |
|---|---|---|---|---|
| 5,774,497 A | * | 6/1998 | Block et al. | 375/226 |
| 5,790,543 A | * | 8/1998 | Cloutier | 370/395 |
| 5,805,602 A | * | 9/1998 | Cloutier et al. | 370/516 |
| 5,933,414 A | * | 8/1999 | Georgiadis et al. | 370/238 |
| 6,452,950 B1 | * | 9/2002 | Ohlsson et al. | 370/516 |
| 7,012,982 B1 | * | 3/2006 | Basch et al. | 375/371 |

* cited by examiner

*Primary Examiner*—Brenda Pham
(74) *Attorney, Agent, or Firm*—Steven A. Shaw; W. James Brady; Frederick J. Telecky, Jr.

(57) ABSTRACT

In order to reduce distortion in playout of audio received in a packet over a packet network, the playout unit needs to determine the relative delay of adjacent packets, jitter, present in the network. The jitter is used to determine buffering for smoothing playout of audio in a packet network. The jitter in packets received from a packet network is calculated based upon the arrival time of a packet, the length of the packet and the arrival time of a subsequent packet. The receiving gateway notes the arrival time of a packet. The length of the audio payload is determined from the size of the payload and the codec used to encode the payload. The length of the payload is added to the arrival time to determine the anticipated arrival of the next subsequent packet. The actual arrival time is noted and the difference between anticipated arrival and actual arrival is used to determine jitter. The present invention is protocol independent because jitter is determined without reference to any time stamp information which may be or may not be contained in a header for certain protocols. The present invention can be implemented in a wider variety of environments because jitter can be calculated without reference to the network packet time stamp.

10 Claims, 1 Drawing Sheet

ADAPTIVE PLAYOUT OF DIGITAL PACKET AUDIO WITH PACKET FORMAT INDEPENDENT JITTER REMOVAL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to adaptive playout of audio packets transported over a packet network without reliance on packet header time-stamp information for jitter removal. In particular, the present invention relates to effective playout through removal of jitter and minimization of delay independent of packetization format.

Voice over packet networks or VoIP requires that the voice or audio signal be packetized and then transmitted. The transmission path will typically take the packets through both packet switched and circuit switched networks between each termination of the transmission. The analog voice signal is first converted to a digital signal and compressed at a gateway connected between a terminal equipment and the packet network. The gateway produces a pulse code modulated (PCM) digital stream from the analog voice.

The PCM stream is analyzed in the gateway and processed according to the parameters of the gateway, such as echo suppression, silence detection and DTMF tone detection. Detected tones are passed separately without encoding. The voice PCM samples are passed to a CODEC for processing prior to packet assembly.

The CODEC creates voice frames from the PCM stream according to the parameters of the codec used. The creation of frames from the PCM stream typically includes compression. The frames are of known size and, based upon the specified rate, are of a determinable time duration. Each frame contains a set number of bits of the PCM stream dependant on the codec used for bi-directional conversion between analog audio and digital packets.

The frames are then assembled into packets by a packet assembler which combines a set number of sequential frames into a single packet data payload. A header, such as a real time protocol (RTP) header is attached to each packet payload to provide a sequence number for identification of the packet and a time stamp for the packet. In the case of RTP format, information about the length of the packet is provided in the IP header. The gatekeeper then assigns an IP address to the packet corresponding to the designated destination of the voice signal to which the packet belongs. An IP header is added to the packet to designate the origination and destination IP addresses for the packet. A UDP header containing source and destination sockets can also be added to the packet.

The packets are routed through the packet network based upon the IP address information. The packet may pass through several switches and routers and the signal in digital and analog form may pass through both packet switches and circuit switches respectively. The packet is likely to accumulate delay as it passes between the near and far end terminal equipment, through the near and far end gateways, through the packet and PSTN networks and through switches.

Because this accumulated delay is erratic and unpredictable and further because each packet may take a different path through the networks, delay can cause the packets to arrive out of sequence and/or with gaps or overlaps. Gapping and overlapping of packets is referred to as delay and the variance in delay from one packet to the next is called jitter. Delay and jitter are measured by comparison of the end time stamp of one packet with the start time stamp of the next packet. If the next packet is received before the end time stamp of the previous packet, there is overlapping delay. If the latest packet is received after the end time stamp of the current packet, the difference in the time is the delay gap. Conditions in the packet network can also cause the loss of packets, referred to as packet loss.

Voice packets are generated at a constant rate and represent continuous and ordered speech. Voice packets should be played out at the receiving end in the same order and at the same rate to accurately reproduce the original analog speech. Because of some inherent loss and delay in a packet network, the packets are reassembled and played out as close to the original sequence and rate as possible to achieve acceptable reproduction.

The receiving gateway will first remove the IP and UDP headers from the packets. Next the RTP information is read and the voice frames extracted from the packet. The RTP information is used to ensure that the packets are in the proper sequence. If a packet is missing, or out of order, the gateway must compensate for the missing frames in that packet in order to avoid undesirable distortion of the voice signal after frame reassembly. If one or more frames in a sequence are missing, the previous frame is repeated at a decreased volume to fill in the gap(s) left by the missing frame(s). If the missing frame subsequently arrives, too late for inclusion in the reassembled sequence of frames, the packet is discarded.

In order to compensate for jitter, the receiving gateway utilizes the sequence and time stamp of the RTP header to smooth the playout by compensating for jitter and/or packet loss by removing gaps and overlaps in the frame sequence. The receiving gateway includes a Voice Playout Unit, VPU, with a FIFO memory buffer for temporary storage of the packets. The purpose of the buffer is to remove the effect of packet arrival jitter from the voice playout. This is accomplished by adding delay before playout, such that the delay is greater than or equal to the maximum jitter encountered. The maximum delay available will be determined by the size of the buffer. Any extra delay before playout will not distort the audio but may reduce audio quality because of the addition of unnecessary delay to the system which can be noticed by users if the delay is of sufficient length. Insufficient delay will cause poor playout quality, because data will be unavailable for playout when packets are late, causing the playout to hesitate and sound distorted.

The reassembled sequence of frames is processed in a codes to return the PCM stream for playout.

SUMMARY OF THE INVENTION

In a non-adaptive, fixed playout delay, three parameters define the delay characteristics of the buffer, FIG. 1. The first is the minimum delay. The minimum delay is set to be sufficient to remove jitter under standard network conditions that is sufficient to hold an incoming packet while another packet is playing. The minimum delay can be set based upon the segment size of the codec. Minimum delay can for example be set to twice the time covered by one segment of the codec to compensate for anticipated network delay. For example, in a codec with a 10 msc sample size, the minimum delay would be set to 20 msc.

The second parameter of the buffer implementation is the nominal delay. The nominal delay is defined by the open channel message to the DSP and is used as the initial delay of the buffer. The voice playout unit will maintain the nominal delay to be equal to or greater than the minimum delay. The minimum delay will be used if the nominal delay is less than the minimum delay. In a non-adaptive voice playout environment, where no minimum delay is established, the voice playout unit will allow the delay to drop to zero and then be reset to the nominal delay.

The third parameter is the maximum delay. The maximum delay is also specified in the open channel message to the DSP. The maximum delay is determined so as to maintain acceptable playout quality. The maximum delay provides an upper bound to the delay in the buffer. If inserting a segment into the buffer will cause the buffer to exceed the maximum delay, then the segment will be discarded.

When the buffer, FIG. 1, is converted to an adaptive voice playout unit, the constraints of the minimum and maximum delays are maintained. The nominal delay parameter is no longer set but instead is calculated and reset from determination of the network jitter. The system detects and measures the jitter of the received packets, FIG. 2, by determining the difference between the expected receive time $t_{exp}$ of each packet and the actual received time $t_{rec}$ of the packet. The jitter value is averaged using a low pass filter initialized with the value of the nominal delay provided in the open channel message. The nominal delay is therefore initially set to the nominal delay defined by the user through the open channel message in the exemplary embodiment, however, the initial nominal delay can be set by any desired method. The nominal delay is recalculated from a linear function of the jitter upon the receipt of each network packet. This allows the system to improve voice quality if the jitter is high, by increasing playout delay and to eliminate unneeded delay if the jitter is low. The value of the nominal delay is always held between the minimum delay and the maximum delay, inclusive.

Playout of the received packets is begun once the nominal delay setting in the buffer is reached. The nominal delay value can be equal to the minimum delay, the maximum delay or any value in between. Playout continues and the nominal delay is computed on an ongoing real time basis, however, adjustments to the delay are not normally made during playout to avoid audio distortion which would result from adjusting delay during voice. Adjustments are only made during silence which is indicated by a SID packet. Once an SID packet is received and playout stops, the last computed nominal delay value is retained and not updated until voice restarts after the silence period. At the restart of voice, the retained nominal delay is used to initialize playout delay. This delay in implementation of a new nominal value can have the effect of lengthening or decreasing periods of silence. As SID packets can only be received when the transmitters VAD is enabled, adaptive playout will not be able to adjust the delay during normal operations if the VAD is disabled on the remote transmitter.

Optionally, a user can enable adaptive playout without the reception of a SID. After applying hysteresis to the computed delay value, voice packets can be repeated or dropped as desired or necessary. The hysteresis prevents dropping or repeating unless the new delay is much different than the old delay. This minimizes but does not eliminate distortion from dropping or repeating voice.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

According to the present invention, jitter is determined by noting the arrival (receive time) of a current packet and by determining the duration of a previous packet from the codec and the payload bit size of the packet. The duration of each packet should be the same, based upon the codec and protocol used by the network. Based upon the receive time $t_{rec}$ and the duration (length l) of the current packet, the expected receive time $t_{exp}$ of the subsequent packet can be determined.

Figure 1:
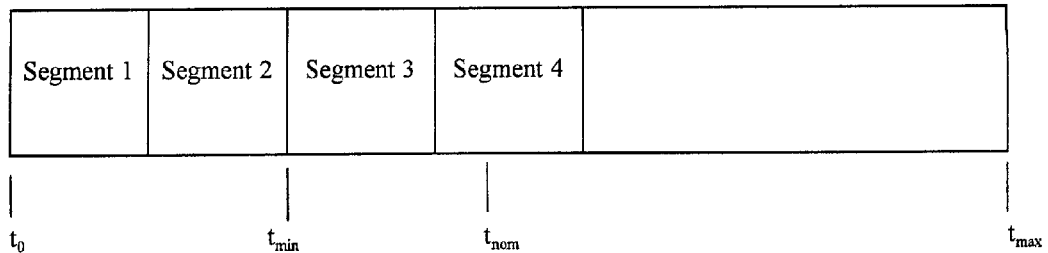
FIG. 1 is a diagram illustrating an exemplary FIFO buffer.
Figure 2:
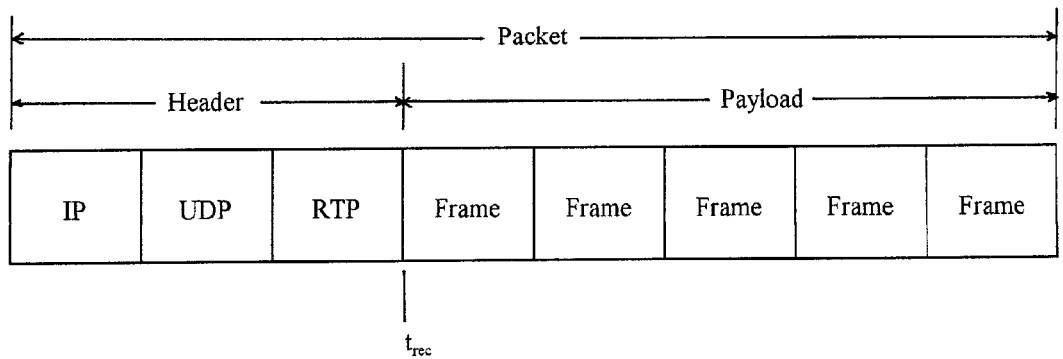
FIG. 2 is a diagram of illustrating an exemplary packet.

As illustrated in FIG. 1, the buffer has a predetermined maximum length, $t_{max}$, set by the maximum delay time. The buffer will also have a set minimum delay, $t_{min}$, which is at least larger than the size of a segment and is set to the length of two segments in the exemplary embodiment. The nominal delay, $t_{nom}$, is initially set and is reset based upon the calculation described below in reference to FIG. 3.

Figure 3:
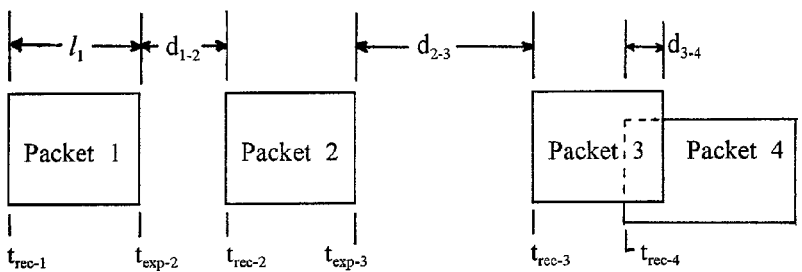
FIG. 3 is a diagram illustrating an exemplary series of packets with varying delay.

For example, in FIG. 3, the VPU notes the receive time $t_{rec-1}$ of a the first packet, packet 1 and calculates the length $l_1$ of packet 1 based on the payload size in bits and the codec playout time to bit size ratio. For example a 10 byte (80 bit) payload using a G729 codec with a 10 ms/80 bits ratio will contain 10 ms of voice, a 160 bit payload using a codec with a 10 ms/80 bits ratio will contain 20 ms of voice. The VPU will add the appropriate time (eg. 10 or 20 ms) to the receive time $t_{rec-1}$ of the first packet to determine the expected receive time $t_{exp-2}$ of the second packet.

The VPU next notes the arrival time $t_{rec-2}$ of the subsequent packet, packet 2. The difference in the anticipated arrival time $t_{exp-2}$ and the recorded arrival time $t_{rec-2}$ of the subsequent packet, packet 2, is the calculated delay $d_{1-2}$ between packet 1 and packet 2 and is used to determine jitter. The delay between packets 1 and 2 is a calculated delay gap because packet 2 arrived late, ie. after its anticipated arrival time. The arrival and calculated delay of subsequent packets is calculated in the same manner, as illustrated in FIG. 3. For packets which arrive too early, eg. packet 4, there is an calculated delay overlap. The calculated delay of each packet is taken as the absolute value of the difference of anticipated and actual arrival time so that calculated delay is always a positive number. The calculated relative delay d for each packet, i, is maintained on a running average in real time to reset the nominal delay for the FIFO buffer when appropriate to allow for proper playout of the received data packets. Individual calculated delay for each packet, i, is continually determined by the formula: $d_i = |t_i - t_{i-1} + l_{i-1}|$ The calculated delay is the absolute value of the difference between anticipated arrival time and actual arrival time because some packets will arrive late (eg. packets 2 and 3) while some packets will arrive early (eg. packet 4). The nominal delay used to set the buffer length must be a positive number representative of the absolute value of the individual calculated delay caused by jitter in the network.

Although the exemplary embodiment illustrated detecting the delay between adjacent packets, eg. packet 1 and packet 2, the teachings of the present invention could be used to determine the delay between and two or more packets in the sequence. For example, the teachings of the present invention could be used to determine the delay between packets 1 and 3 by detecting the arrival time $t_{rec-1}$ of packet 1 and determining the anticipated arrival time $t_{exp-3}$ of packet 3 by adding twice the duration l of the packet to $t_{rec-1}$. The delay between packets 1 and 3 would be twice the average of $d_{1-2}$ and $d_{2-3}$. The average delay between packets 1, 2 and 3 can therefore be determined by dividing the delay between packets 1 and 3 by two. The formula: $d_i=|t_i-t_{i-2}+2l_{i-1}|/2$, can be used to calculate the running average delay. Jitter determination for maintenance of the nominal delay can be based upon a running average instead of a running calculation of each individual delay, if desired. For example, the delay between packets 1 and 3 would be calculated and averaged, next the delay between packets 2 and 4 would be calculated and averaged, then the delay between packets 3 and 5 and so on.

Further, in order to reduce processing at the VPU, it is not necessary to calculate delay each time a packet is received. By using the alternative calculation method above, and performing the calculation for every second value of i, delay can be calculated only half as often as a packet is received. For example the delay between packets 1 and 3 would be calculated and averaged, then the delay between packets 3 and 5 would be calculated and averaged, next the delay between packets 5 and 7 would be calculated and averaged. It would not be necessary to calculate the other packet delays. Processing at the VPU is reduced because only the arrival time of every other packet need be noted and the calculation of delay need only be made half as often.

Further reduction in processing can be achieved by averaging over 3 or more sequential packets. The equation $d_i=|t_i-t_{i-n}+nl_{i-1}|/n$, would be used where n is the number of packets over which averaging occurs and where i is indexed by n. The balance between processor savings and jitter accuracy determination has to be made dependent upon network conditions. However, because delay is both additive and subtractive, ie some packets arrive late and have a delay gap while others arrive early with a delay overlap, on average over a sufficient number of packets, the value of the sum of the delays will be zero. The calculation of average delay will only be useful over a limited number of packets, dependant upon network conditions.

By calculating the jitter based upon arrival time and packet length, the present invention is independent of the time stamp and time stamp reference of the RTP header or other headers in the packet network. The present invention can accurately determine jitter and set the nominal delay for the VPU buffer to achieve optimized playout with minimal network delay.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

I claim:

1. A method for playing a plurality of received packets after determining jitter in a packet network, comprising:
   detecting the arrival time of a first network packet;
   determining the duration of said first network packet, comprising:
      detecting the size in bits of the payload of said first network packet; and
      multiplying said bit size of said payload by the time-duration-per-bit ratio of the packet codec used to encode the packet payload;
   determining the anticipated arrival time of a subsequent network packet based upon said detected arrival time of said first network packet and said determined duration of said first network packet;
   detecting the arrival time of said subsequent network packet;
   determining network jitter based upon the difference between said anticipated arrival time and said detected arrival time of said subsequent network packet;
   setting a nominal delay setting using said determined network jitter; and
   playing said plurality of received packets once the nominal delay setting is reached.

2. The method of claim 1, wherein said anticipated arrival time of said subsequent network packet is determined by adding said determined duration of said first network packet to said arrival time of said first network packet.

3. The method of claim 1, wherein said detecting the arrival time of said first network packet utilizes a time stamp reference at a packet receiving apparatus without reference to network time stamping of said packet.

4. The method of claim 2, wherein said detecting the arrival time of said subsequent network packet utilizes a time stamp reference at a packet receiving apparatus without reference to network time stamping of said packet.

5. The method of claim 1, wherein said subsequent network packet immediately follows said first network in said sequence.

6. The method of claim 1, wherein said subsequent network packet is spaced by a predetermined number of packets from said first network packet.

7. The method of claim 1, further comprising:
   identifying said subsequent network packet based upon the sequence of said network packets.

8. The method of claim 7, wherein said sequence is used to identify each subsequent network packet immediately following each network packet in said sequence.

9. The method of claim 5, wherein said sequence identifier is used to identify subsequent network packets spaced by a number of packets from each respective first network packet.

10. A method for playing audio payloads in a packet network, at an apparatus for receiving a plurality packets in said packet network, comprising:
   providing a timing apparatus at said receiving apparatus;
   detecting the arrival time of each network packet with reference to said timing apparatus;
   determining the duration of each network packet audio payload;
   determining the anticipated arrival time of respective subsequent network packets following each network packet, based upon said detected arrival time of each network packet and said determined duration of each network packet;
   detecting the arrival time of said respective subsequent network packets;
   determining network jitter based upon the difference between said anticipated arrival time and said detected arrival time of said respective subsequent network packets;
   maintaining a running average of said determined jitter between each adjacent network packet pair;
   setting a nominal delay setting using said determined network jitter; and
   playing said plurality of received packets once the nominal delay setting is reached.

* * * * *